United States Patent
Sheu et al.

(10) Patent No.: US 10,245,815 B2
(45) Date of Patent: Apr. 2, 2019

(54) SURFACE TREATMENT METHOD FOR CASING

(71) Applicant: MiiCs & Partners (Shenzhen) Co., Ltd., Shenzhen (CN)

(72) Inventors: Yi-Zhong Sheu, New Taipei (TW); Han-Lung Chao, New Taipei (TW); Han-Lung Lee, New Taipei (TW); Hung-Chun Ma, New Taipei (TW); Chih-Jung Chang, New Taipei (TW); Jih-Chen Liu, New Taipei (TW); Feng-Yuen Dai, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 234 days.

(21) Appl. No.: 15/247,002

(22) Filed: Aug. 25, 2016

(65) Prior Publication Data

US 2017/0297315 A1    Oct. 19, 2017

(30) Foreign Application Priority Data

Apr. 15, 2016  (CN) .......................... 2016 1 0233468

(51) Int. Cl.
  *B32B 37/00*  (2006.01)
  *B32B 37/10*  (2006.01)
  (Continued)

(52) U.S. Cl.
  CPC ............. *B32B 37/025* (2013.01); *B32B 1/02* (2013.01); *B32B 3/30* (2013.01); *B32B 7/12* (2013.01); *B32B 27/06* (2013.01); *B32B 27/306* (2013.01); *B32B 27/36* (2013.01); *B32B 37/10* (2013.01); *B32B 37/1018* (2013.01); *B32B 37/12* (2013.01); *B32B 37/26* (2013.01); *B32B 38/004* (2013.01); *B32B 38/145* (2013.01); *B41J 2/01* (2013.01); *B41J 11/002* (2013.01); *B32B 2037/268* (2013.01); *B32B 2255/26* (2013.01); *B32B 2307/402* (2013.01); *B32B 2307/406* (2013.01); *B32B 2307/4023* (2013.01); *B32B 2307/412* (2013.01); *B32B 2307/728* (2013.01); *B32B 2307/748* (2013.01); *B32B 2310/0831* (2013.01); *B32B 2429/00* (2013.01);
  (Continued)

(58) Field of Classification Search
  CPC ..... B32B 37/025; B32B 37/1018; B32B 3/30; B32B 38/0036; B32B 38/004; B32B 38/145; B32B 2307/4023; B32B 2310/0831; B32B 2439/00; B41J 2/01; B41J 11/02; B41M 7/0081; B44C 1/00; G06F 1/1613; G06F 1/1626; H04M 1/0202; H04M 1/0283; H04B 1/3888
  See application file for complete search history.

(56) References Cited

U.S. PATENT DOCUMENTS

| | | | | |
|---|---|---|---|---|
| 2013/0257241 A1* | 10/2013 | Hwang | .................... | H05K 5/02 312/223.1 |
| 2015/0111623 A1* | 4/2015 | Hegemier | ........... | H04M 1/0283 455/575.1 |

* cited by examiner

*Primary Examiner* — Carson Gross
(74) *Attorney, Agent, or Firm* — ScienBiziP, P.C.

(57) ABSTRACT

A surface treatment method for a casing is disclosed, the casing being formed by the outer surface and four sidewalls of the casing. The surface treatment method includes a heat transferring film formed on the casing by a vacuum heat transfer process or a paint-drying process and a surface pattern layer formed on a portion of a surface of the heat transferring film opposite to the outer surface by a digital inkjet printer applying three different types of UV-curable ink.

10 Claims, 9 Drawing Sheets

(51) Int. Cl.
*B32B 38/00* (2006.01)
*H04B 1/3888* (2015.01)
*B41J 11/00* (2006.01)
*H04M 1/02* (2006.01)
*G06F 1/16* (2006.01)
*B32B 37/12* (2006.01)
*B32B 37/26* (2006.01)
*B32B 1/02* (2006.01)
*B41J 2/01* (2006.01)
*B32B 7/12* (2006.01)
*B32B 27/06* (2006.01)
*B32B 27/30* (2006.01)
*B32B 27/36* (2006.01)
*B32B 3/30* (2006.01)
*B41M 7/00* (2006.01)

(52) U.S. Cl.
CPC ........ *B32B 2439/00* (2013.01); *B41M 7/0081* (2013.01); *G06F 1/1626* (2013.01); *H04B 1/3888* (2013.01); *H04M 1/0202* (2013.01)

SURFACE TREATMENT METHOD FOR CASING

FIELD

The subject matter herein generally relates to surface treatment methods, and more particularly, to a surface treatment method for a casing.

BACKGROUND

Basic casings of electronic devices (such as mobile phones, tablet computers, and multimedia players) may include a casing with a flat outer surface and four sidewalls. A surface treatment method for such a casing may be complicated. Under some circumstance for example, a protective film is required to be formed on and fully wrapped around the casing via a surface treatment method to protect the electronic device from being damaged. To further complicate matters, the protective film may also need to be formed as a pattern or may need to allow for decorative patterning. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
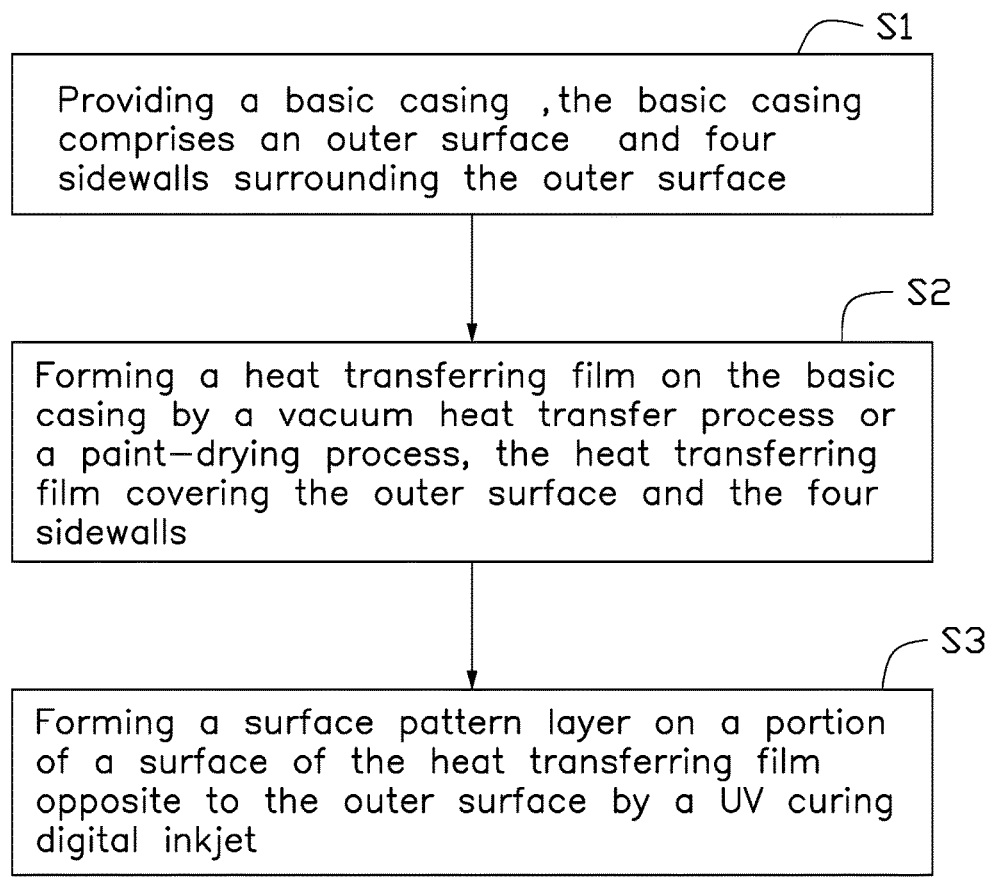
FIG. 1 is a flowchart of an embodiment of a surface treatment method for a casing.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series, and the like.

A flowchart of an exemplary method is presented. The exemplary surface treatment method for a casing 10 (shown in FIGS. 2 and 3) is provided by way of example, as there are a variety of ways to carry out the method. The casing 10 is formed by an outer surface 11 and four sidewalls 12 surrounding the outer surface 11. Each block shown in FIG. 1 represents one or more processes, methods, or subroutines carried out in the exemplary method. Additionally, the illustrated order of blocks is by example only and the order of the blocks can change. The exemplary method can begin at block S1.

Figure 2:
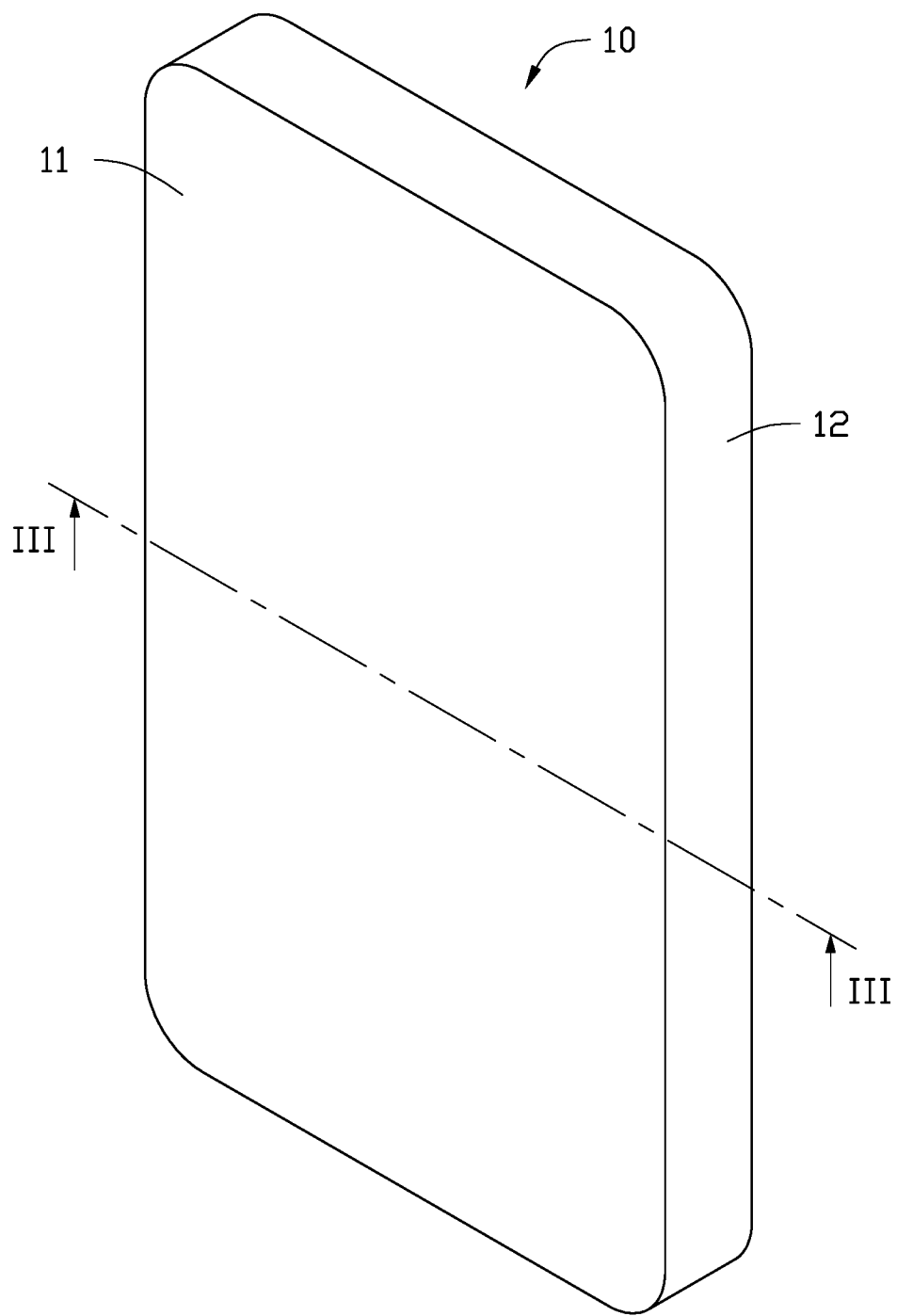
FIG. 2 is an isometric view of a composite case of FIG. 1.
Figure 3:
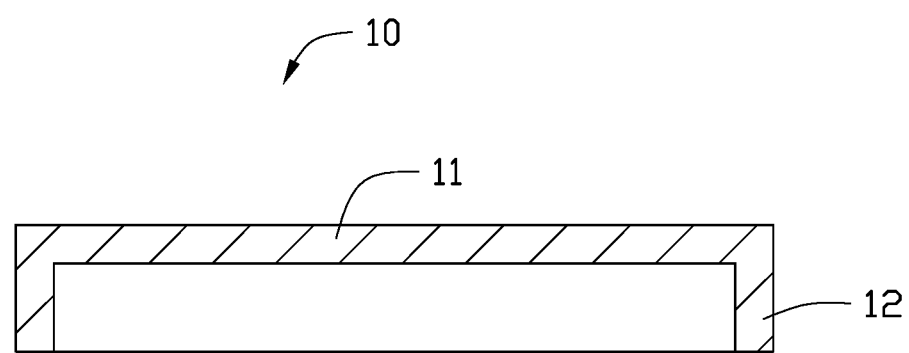
FIG. 3 is a cross-sectional view taken along line of FIG. 2.

At block S1, referring to FIGS. 2 and 3, a casing 10 is provided.

In at least one exemplary embodiment, the casing 10 comprises an outer surface 11 and four sidewalls 12 surrounding the outer surface 11.

At block S2, referring to FIGS. 4-7, a heat transferring film 20 is formed on the casing 10 by a vacuum heat transfer process or a paint-drying process. The heat transferring film 20 covers the outer surface 11 and the four sidewalls 12.

In at least one embodiment, the heat transferring film 20 is formed by a vacuum heat transfer process which can be carried out as follows.

Figure 4:
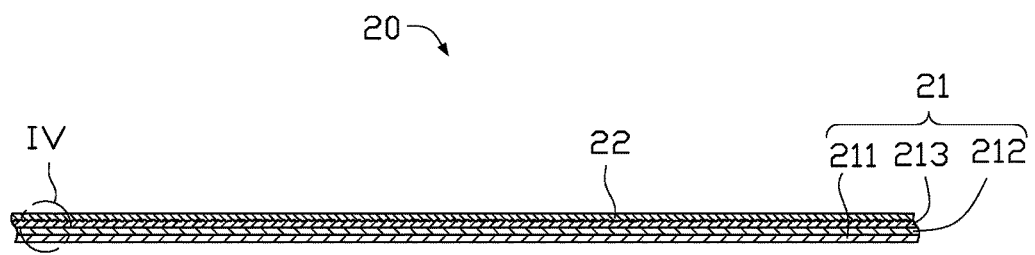
FIG. 4 is a cross-sectional view of an exemplary embodiment of a heat transferring film used in the surface treatment method of FIG. 1.

Referring to FIG. 4, a heat transferring film 20 is provided.

In at least one embodiment, the heat transferring film 20 comprises a heat pressing layer 21 and an attached releasing film layer 22.

The heat pressing layer 21 comprises a glue layer 211, a pattern layer 212, and a first protective layer 213 stacked in that order. Since the pattern layer 212 is sandwiched between the first protective layer 213 and the glue layer 211, the pattern layer 212 is protected from being damaged.

The releasing film layer 22 is attached to a surface of the first protective layer 213 facing away from the pattern layer 212. The releasing film layer 22 is made of a water soluble material capable of being extending toward two orthogonal axes. In at least one embodiment, the releasing film layer 22 is made of polyvinyl alcohol or polyethylene terephthalate.

In at least one embodiment, the glue layer 211 is made of a heatable glue which can be melted onto the casing 10 when heated. The first protective layer 213 is made of a transparent resin, and can be formed by spraying, coating, planographic printing, or screen printing.

Figure 5:
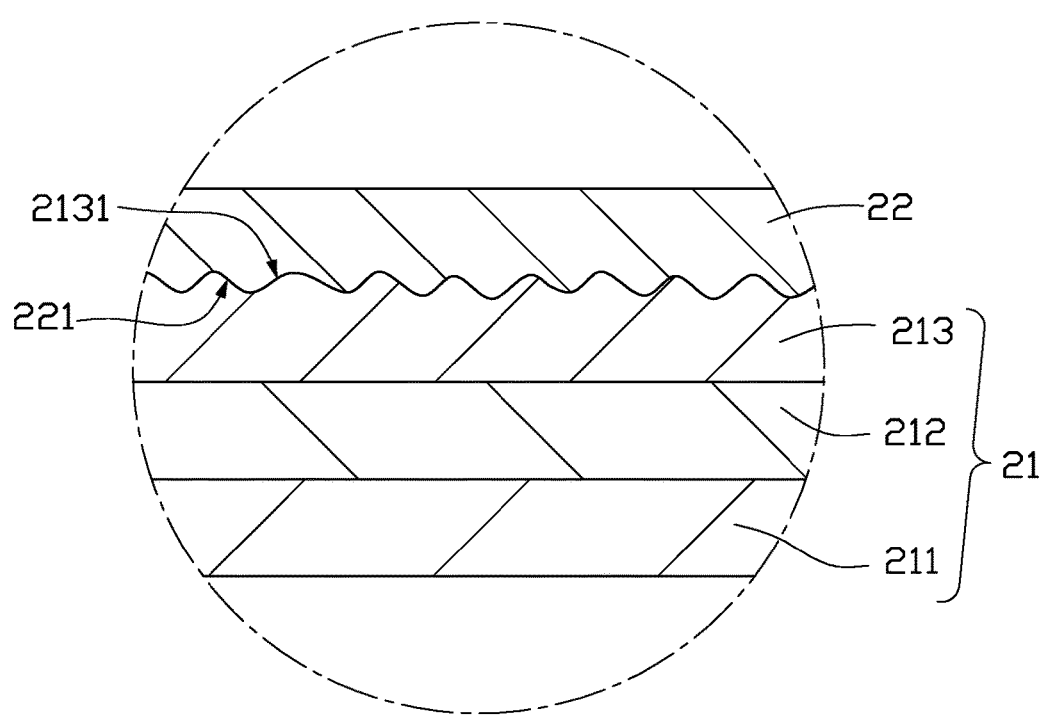
FIG. 5 is an exploded view of the circular portion IV of FIG. 4.

Referring to FIG. 5, a surface of the releasing film layer 22 attached to the first protective layer 213 comprises a plurality of microstructures 221. The microstructures 221 are three dimensional (3D) curved structures formed by embossing or engraving. A surface of the first protective layer 213 attached to the releasing film layer 22 also comprises microstructures 2131 which match the microstructures 221 in shape.

Figure 6:
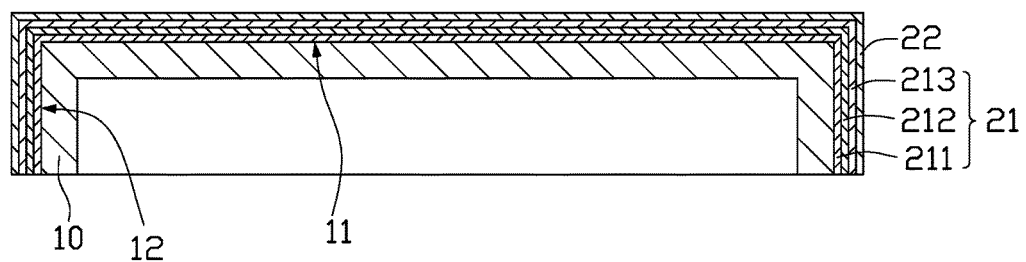
FIG. 6 is a cross-sectional view showing the heat transferring film in FIG. 4 formed on the casing in FIG. 3.

Referring to FIG. 6, the heat transferring film 20 is formed on the casing 10 under heat and vacuum pressure using a heat pressing machine (not shown), with the glue layer 211 being attached to the casing 10. The heat transferring film 20 covers the outer surface 11 and the four sidewalls 12.

Figure 7:
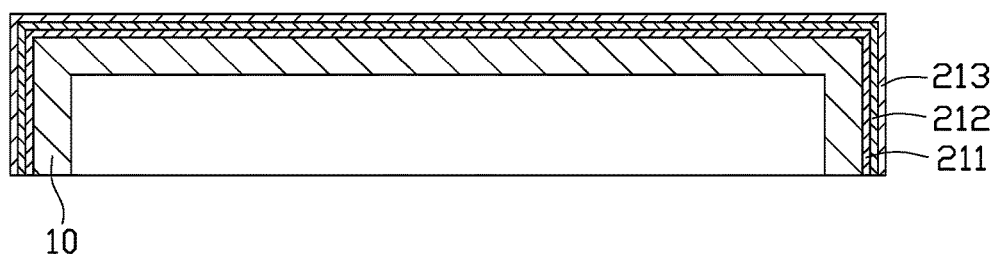
FIG. 7 is a cross-sectional view showing the releasing film layer released from the heat transferring film of FIG. 6.

Referring to FIG. 7, the releasing film layer 22 of the heat transferring film 20 is removed to expose the heat pressing layer 21.

Figure 8:
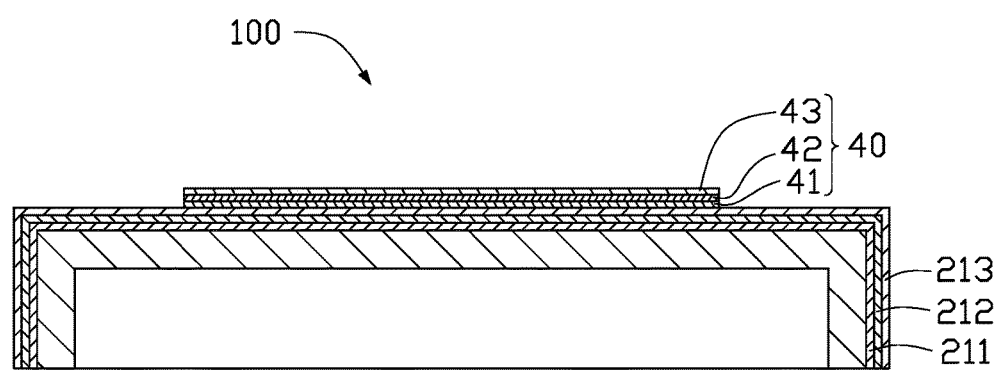
FIG. 8 is a cross-sectional view showing a surface pattern layer formed on the coating of the casing to form a finished casing.
Figure 9:
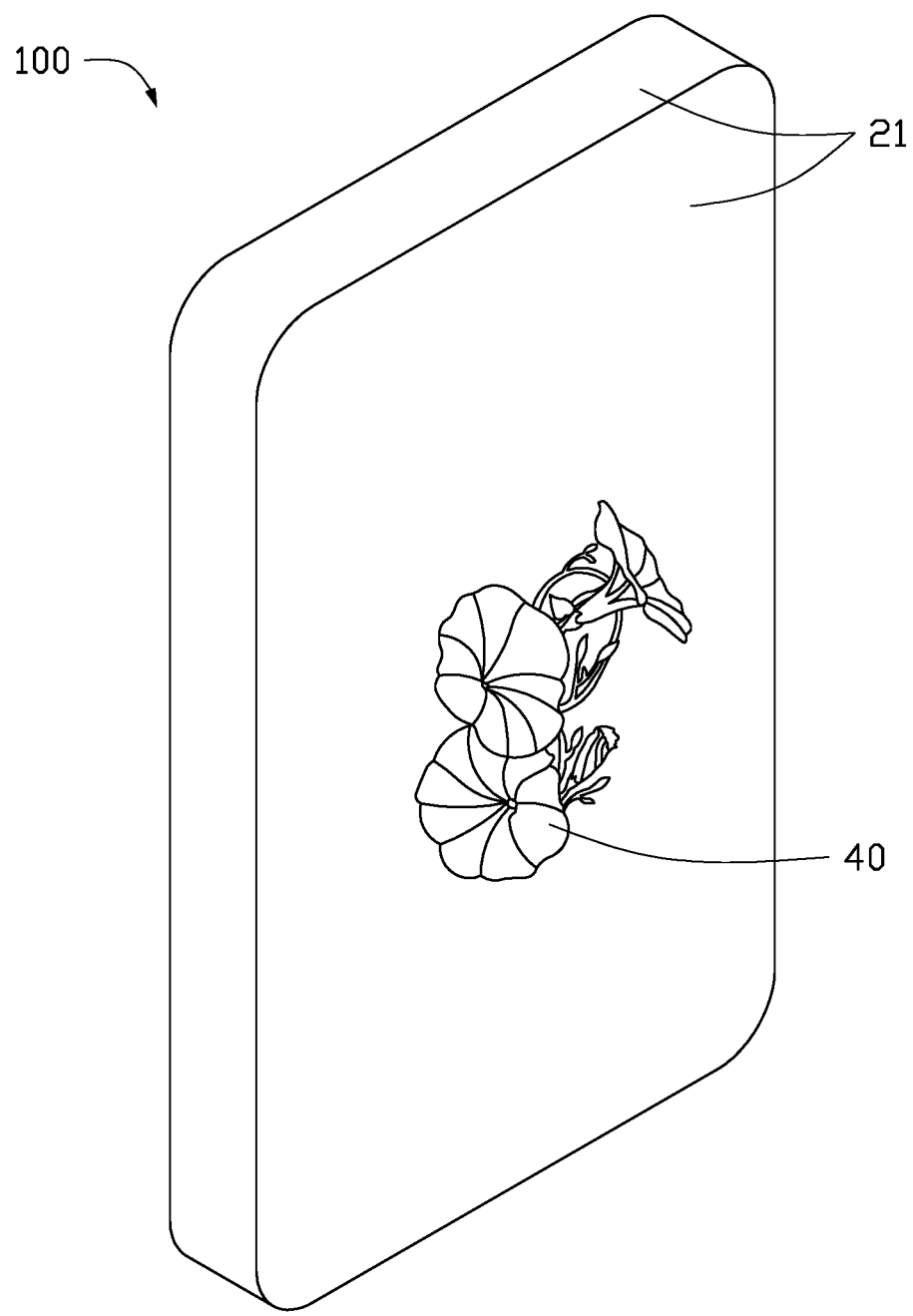
FIG. 9 is an isometric view of the finished casing of FIG. 8 shown from another angle.

At block S3, referring to FIGS. 8 and 9, a surface pattern layer 40 is formed on the glue layer 211 of the heat transferring film 20 by a digital inkjet, curable by ultraviolet light (UV), thereby a finished casing 100 is formed.

In at least one embodiment, the surface pattern layer 40 comprises a basic layer 41, a printing pattern layer 42, and a second protective layer 43 in that order. The printing pattern layer 42 comprises desired patterns. The basic layer 41 is attached to a portion of a surface of the first protective layer 213 facing away from the pattern layer 212.

In other embodiments, the surface pattern layer 40 can further comprise a filler layer (not shown) sandwiched between the basic layer 41 and the printing pattern layer 42.

In at least one embodiment, the surface pattern layer 40 is formed via the digital inkjet printing process as follows.

A printing head of the ink jet printer is controlled to output UV-curable basic inks onto a surface of the first protective layer 213 facing away from the pattern layer 212. At least one ultraviolet lamp is controlled to emit ultraviolet light which can solidify the basic inks to form the basic layer 41. A second printing head of the ink jet printer is controlled to output UV-curable color inks onto a surface of the basic layer 41 facing away from the first protective layer 213, and the ultraviolet lamp is controlled to emit ultraviolet light which can solidify the color inks to form the printing pattern layer 42. Then, a third printing head of the ink jet printer is controlled to output UV-curable glossy inks onto a surface of the printing pattern layer 42 facing away from the basic layer 41, and the ultraviolet lamp is controlled to emit ultraviolet light which can solidify the glossy inks to form the second protective layer 43. Thus, the surface pattern layer 40 is formed.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present exemplary embodiments to the full extent indicated by the plain meaning of the terms in which the appended claims are expressed.

What is claimed is:

1. A surface treatment method for a casing, the casing having an outer surface and four sidewalls surrounding the outer surface, the surface treatment method comprising:
    forming a heat transferring film on the casing by a vacuum heat transfer process or a paint-drying process, the heat transferring film covering the outer surface and the four sidewalls; wherein the process of forming the heat transferring film on the casing further comprises:
        a heat pressing layer and a releasing film layer attached to a surface of the heat pressing layer;
        forming the heat transferring film on the casing under heat and vacuum pressure using a heat pressing machine, with the heat pressing layer being attached to the casing; and
        removing the releasing film layer of the heat transferring film to expose the heat pressing layer; and
    forming a surface pattern layer on a portion of the heat transferring film facing away from the outer surface by a digital inkjet curable by ultraviolet light.

2. The surface treatment method of claim 1, wherein the heat pressing layer comprises a glue layer, a pattern layer, and a first protective layer stacked in that order; the releasing film layer is attached to a surface of the first protective layer facing away from the pattern layer; the first protective layer prevents the pattern layer from being damaged.

3. The surface treatment method of claim 2, wherein the glue layer is made of a hot glue which is able to be melted onto the casing when heated.

4. The surface treatment method of claim 2, wherein the first protective layer is made of a transparent resin.

5. The surface treatment method of claim 1, wherein the releasing film layer is made of a water soluble material capable of being extending toward two orthogonal axes.

6. The surface treatment method of claim 2, wherein a surface of the releasing film layer attached to the first protective layer comprises a plurality of microstructures; a surface of the first protective layer attached to the releasing film layer also comprises microstructures which match the microstructures of the releasing film layer.

7. The surface treatment method of claim 6, wherein the microstructures are three dimensional curved structures formed by embossing or engraving.

8. The surface treatment method of claim 2, wherein the surface pattern layer comprises a basic layer, a printing pattern layer, and a second protective layer in that order; the basic layer is attached to the portion of the first protective layer facing away from the pattern layer; the second protective layer prevents the printing pattern layer from being damaged.

9. The surface treatment method of claim 8, wherein the printing pattern layer comprises desired patterns.

10. The surface treatment method of claim 8, wherein the steps of forming a surface pattern layer on a portion of the heat transferring film facing away from the outer surface by a digital inkjet curable by ultraviolet light further comprises:
    controlling a printing head of an ink jet printer to output UV-curable basic inks onto a surface of the first protective layer facing away from the pattern layer, and controlling the ultraviolet lamp to emit ultraviolet light which can solidify the UV-curable basic inks to form the basic layer;
    controlling a second printing head of the ink jet printer to output UV-curable color inks onto a surface of the basic layer facing away from the first protective layer, and controlling the ultraviolet lamp to emit ultraviolet light which can solidify the UV-curable color inks to form the printing pattern layer; and
    controlling a third printing head of the ink jet printer to output UV-curable glossy inks onto a surface of the printing pattern layer facing away from the basic layer; and
    controlling the ultraviolet lamp emit ultraviolet light which can solidify the UV-curable glossy inks to form the second protective layer; wherein the first protective layer and the second protective layer prevent the pattern layer and the printing pattern layer, respectively, from being damaged.

* * * * *